United States Patent
Razavi et al.

(10) Patent No.: US 9,686,469 B2
(45) Date of Patent: Jun. 20, 2017

(54) AUTOMATIC DIGITAL CAMERA PHOTOGRAPHY MODE SELECTION

(71) Applicant: Apple Inc., Cupertino, CA (US)

(72) Inventors: Frank Razavi, Fairport, NY (US);
Bruce H. Pillman, Rochester, NY (US);
Kenneth A. Parulski, Rochester, NY (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 15/050,284

(22) Filed: Feb. 22, 2016

(65) Prior Publication Data

US 2016/0248976 A1 Aug. 25, 2016

Related U.S. Application Data

(63) Continuation of application No. 14/582,302, filed on Dec. 24, 2014, now Pat. No. 9,270,882, which is a continuation of application No. 12/843,275, filed on Jul. 26, 2010, now Pat. No. 8,970,720.

(51) Int. Cl.
*H04N 5/76* (2006.01)
*H04N 5/232* (2006.01)

(52) U.S. Cl.
CPC ..... *H04N 5/23245* (2013.01); *H04N 5/23216* (2013.01); *H04N 5/23222* (2013.01); *H04N 5/23241* (2013.01)

(58) Field of Classification Search
CPC .................................................. H04N 5/23245
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly |

(Continued)

FOREIGN PATENT DOCUMENTS

| | | |
|---|---|---|
| CN | 1936685 A | 3/2007 |
| EP | 1220530 | 7/2002 |

(Continued)

OTHER PUBLICATIONS

Lowe, "Distinctive Image Features from Scale-Invariant Keypoints," International Journal of Computer Vision 60 (2), 91-110, 2004.

*Primary Examiner* — Gary C Vieaux
(74) *Attorney, Agent, or Firm* — Blank Rome LLP

(57) ABSTRACT

A digital camera having a plurality of photography modes, comprising: an image sensor; an optical system for imaging a scene onto the image sensor; an image capture control for initiating an image capture operation; a photography mode user interface for selecting between a plurality of photography modes, the photography modes having associated image capture and image processing settings; a power control for turning the digital camera on or off, wherein when the camera is in an off state and the power control is activated with a first activation pattern the digital camera is turned on and set to operate in a default photography mode and when the power control is activated with a second activation pattern the digital camera is turned on and set to operate in a previously selected photography mode.

20 Claims, 5 Drawing Sheets

(56) References Cited

U.S. PATENT DOCUMENTS

| | | |
|---|---|---|
| 4,939,601 A | 7/1990 | Endo |
| 5,189,511 A | 2/1993 | Parulski |
| 5,493,335 A | 2/1996 | Parulski |
| 5,652,621 A | 7/1997 | Adams, Jr. |
| 5,668,597 A | 9/1997 | Parulski |
| 5,721,989 A * | 2/1998 | Kitazawa ............... G03B 17/18 396/280 |
| 6,192,162 B1 | 2/2001 | Hamilton, Jr. |
| 6,292,218 B1 | 9/2001 | Parulski |
| 6,301,440 B1 | 10/2001 | Bolle |
| 6,571,066 B1 | 5/2003 | Tsai |
| 6,727,830 B2 | 4/2004 | Lui |
| 6,778,770 B1 | 8/2004 | Cazier |
| 6,934,056 B2 | 8/2005 | Gindele |
| 6,976,215 B1 | 12/2005 | Roderick |
| 7,139,445 B2 | 11/2006 | Pilu |
| 7,212,235 B2 | 5/2007 | Nakayama |
| 7,542,077 B2 | 6/2009 | Miki |
| 7,646,297 B2 | 1/2010 | Aaron |
| 7,721,227 B2 | 5/2010 | Ronkainen |
| 2002/0130959 A1 | 9/2002 | McGarvey |
| 2004/0072589 A1 | 4/2004 | Hamamura |
| 2004/0119877 A1 | 6/2004 | Shinozaki |
| 2005/0168611 A1 | 8/2005 | Yamaya |
| 2005/0191729 A1 | 9/2005 | Kaczmarek |
| 2006/0044400 A1 | 3/2006 | Lee |
| 2007/0008321 A1 | 1/2007 | Gallagher |
| 2007/0024931 A1 | 2/2007 | Compton |
| 2007/0248330 A1 | 10/2007 | Pillman |
| 2008/0129836 A1 | 6/2008 | Kim |
| 2008/0133791 A1 | 6/2008 | Hodges |
| 2008/0143518 A1* | 6/2008 | Aaron ............... H04M 1/72569 340/540 |
| 2009/0180659 A1 | 7/2009 | Sander |
| 2009/0290807 A1 | 11/2009 | Marchesotti |
| 2009/0297032 A1 | 12/2009 | Loui |
| 2010/0149370 A1 | 6/2010 | Kim |
| 2011/0102630 A1* | 5/2011 | Rukes ................... H04N 9/735 348/223.1 |
| 2012/0019704 A1 | 1/2012 | Levey |
| 2012/0140088 A1 | 6/2012 | Clark |

FOREIGN PATENT DOCUMENTS

| | | |
|---|---|---|
| GB | 2403365 | 12/2004 |
| JP | 7306436 | 11/1995 |
| JP | 2000299814 A | 10/2000 |
| JP | 2001211369 | 8/2001 |
| JP | 2002094854 | 3/2002 |
| JP | 2003032611 | 1/2003 |
| JP | 2003248262 A | 9/2003 |
| JP | 2006253887 A | 9/2006 |
| JP | 2008078738 A | 4/2008 |
| JP | 2010016761 A | 1/2010 |
| JP | 2010158041 A | 7/2010 |
| TW | 200818883 A | 4/2008 |

\* cited by examiner

AUTOMATIC DIGITAL CAMERA PHOTOGRAPHY MODE SELECTION

CROSS-REFERENCE TO RELATED APPLICATIONS

This application is a continuation application of U.S. patent application Ser. No. 14/582,302, filed Dec. 24, 2014, now U.S. Pat. No. 9,270,882, which is a continuation of U.S. patent application Ser. No. 12/843,275, filed Jul. 26, 2010, now U.S. Pat. No. 8,970,720, both of which are incorporated herein by reference in their entireties.

Reference is made to commonly assigned, U.S. patent application Publication No. 2012/0019704, entitled: "Automatic Digital Camera Photography Mode Selection," by Charles I. Levey, which is incorporated herein by reference.

FIELD OF THE INVENTION

This invention pertains to the field of digital cameras and more particularly to the automatic selection of a photography mode.

BACKGROUND OF THE INVENTION

Digital cameras with a multitude of operational features including but not limited to exposure control, white balance, auto focus, etc. have been a consumer staple for decades. As camera complexity has increased, required actions by the user to operate digital cameras have increased.

Most digital cameras have a variety of photography modes that can be selected by the user to control various elements of the image capture process, and the image processing chain. Examples of typical photography modes include smart capture, portrait, sport, landscape, close-up, sunset, backlight, children, bright, self-portrait, night portrait, night landscape, high-ISO and panorama. Various methods have been described to select an appropriate photography mode and control other digital camera functions. Some digital cameras include mechanical dials that can be used to select the photography mode. However, this adds expense to the digital camera and limits the number of choices that can be offered.

In other digital camera models, the photography mode can be selected by navigating a series of menus on a soft-copy display on the back of the digital camera. Often it can be a lengthy process for the user to navigate through several levels of menus to choose the desired photography mode. Then, if the user turns the camera off and back on again, it is generally necessary to repeat those time-consuming steps again in order to return to the same photography mode. This can be a frustrating experience for the user.

In some digital camera models, a photography mode can automatically be selected based on context, such as scene brightness, scene motion. For example, the KODAK EASY-SHARE Z915 Digital Camera includes a "Smart Capture" feature which automatically adjusts the camera settings. The camera detects and analyzes scene conditions, and then automatically sets camera settings including exposure, focus and ISO speed based on these conditions. This selection can be convenient, since it does not require user intervention. However, it is limited because the user has no simple way to influence the selection of the photography mode, aside from simply overriding the automatic photography mode selection. Because automatic selection of photographic mode is imperfect, there remains a need for user control, but there is also a need to easily get the camera to operate in a user-selected mode at power-up.

U.S. Pat. No. 7,646,297 to Aaron, entitled "Context-detected auto-mode switching" describes a method for self configuration of a communication device to adjust to the user's environmental circumstances. At predetermined intervals, a suite of environmental sensors integral to the device, which can include a camera, periodically samples the user's environment. A derived set of environmental circumstances may then be compared to mode templates to determine a matching template. The operational settings of the device, such as the audio level and display screen contrast, are changed based on the matching template.

U.S. Pat. No. 6,571,066 to Tsai, entitled "Camera with multimode power button," describes a method for using the power button to either turn on the camera or to select the camera operation mode. This scheme requires multiple pushes of the power button to first turn on the camera then select the operating mode.

U.S. Pat. No. 7,721,227 to Ronkainen, entitled "Method for describing alternative actions caused by pushing a single button," describes a user interface for making a choice between two different actions dependent on how long a button is depressed. If the button is released immediately, a first action is taken. If the button is held for a longer period of time, a message is displayed indicating that if the button is continued to be held a second action will be taken. If the button is not released within a specified time interval, the second action is then taken.

U.S. Pat. No. 6,727,830 to Lui, entitled "Time based hardware button for application launch," teaches the use of a time dependent press of an "application" button to select between various functions. Multiple button presses can also be used to select different functions.

U.S. Pat. No. 6,976,215 to Roderick et al., entitled "Push-button user interface with functionality preview," teaches a user-interface that uses a pressure-sensitive multi-state button. If the button is pushed with a first pressure a preview is provided of the effect that will be produced if the button is pressed using a higher pressure.

These approaches all rely on a user interface to control the selection of a photography mode when the camera is powered on. In some instances, photography of a particular event may occur over an extended period of time, such as during a concert or ceremony, during a day of skiing, or during a soccer game. During such extended events, the camera is likely to be powered down occasionally between shots. This generally requires that the user manually navigate the user interface at each power up to return the digital camera to the appropriate photography mode.

There remains a need for a method to automatically return a digital camera to a previously-selected photography mode while photographing a particular event, without adding the cost of additional buttons or the inconvenience of needing to navigate complex user-interface menus.

SUMMARY OF THE INVENTION

The present invention represents a digital camera having a plurality of photography modes, comprising: an image sensor; an optical system for imaging a scene onto the image sensor; an image capture control for initiating an image capture operation; a photography mode user interface for enabling a user to select between a plurality of photography modes, the photography modes having associated image capture and image processing settings; a memory for storing captured digital images, and for storing one or more previous digital camera contexts and corresponding user-selected photography modes; and a power control for powering up or powering down the digital camera; wherein when the power control is activated to power up the digital camera, a digital camera context is determined and compared to the stored previous digital camera contexts, and if the digital camera context is determined to be sufficiently similar to one of the stored previous digital camera contexts, the digital camera is set to operate in the corresponding user-selected photography mode, otherwise the digital camera is set to operate in a default photography mode.

The present invention has the advantage that it simplifies camera operation by automatically returning to a previously selected photography mode when the digital camera is powered on and the current picture-taking context is sufficiently similar to a previous picture-taking context.

It has the additional advantage that consistency of camera behavior is enhanced during photography in a particular context. Because the previously selected mode is automatically selected if the context is the same, there is no need to rely on the user to maintain consistency of the photography mode. At the same time, user control is preserved, since the normal user-interface for controlling photography mode is preserved.

It has the further advantage that no additional user interface controls are required to provide the added functionality.

DETAILED DESCRIPTION

Figure 1:
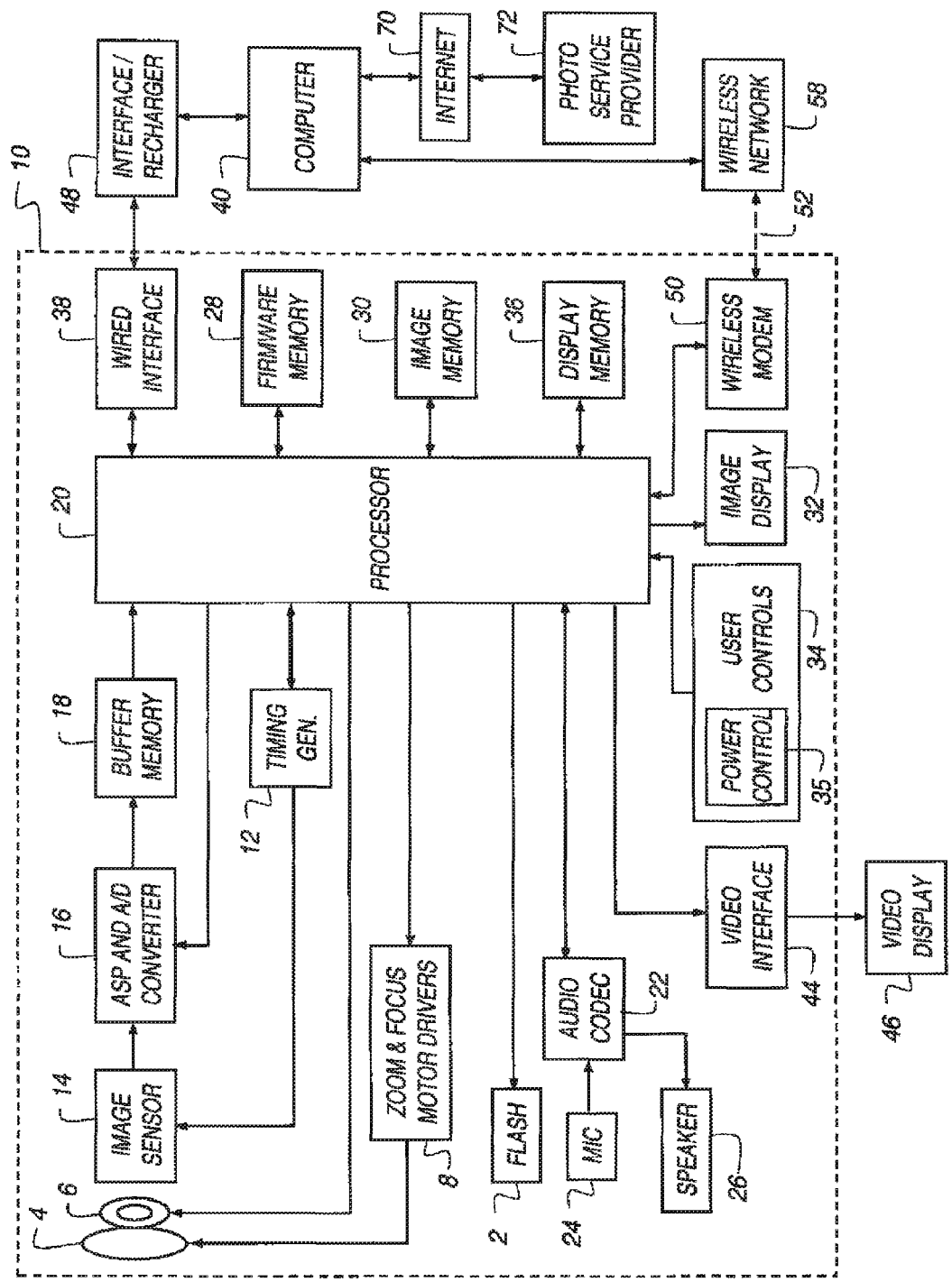
FIG. 1 is a high-level diagram showing the components of a system for capturing digital images according to an embodiment of the present invention.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drivers 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity", the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixel values, or by combining some color pixel values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used. In a preferred embodiment, the user controls 34 include a power control 35 (e.g., a power button) which is used to turn on or off the camera, as well as other controls such as a lens control to control the lens 4, and an image capture control (e.g., a shutter button) to initiate an image capture operation. In some embodiments, the still preview mode is initiated when the user partially depresses the shutter button, and the still image capture mode is initiated when the user fully depresses the shutter button.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
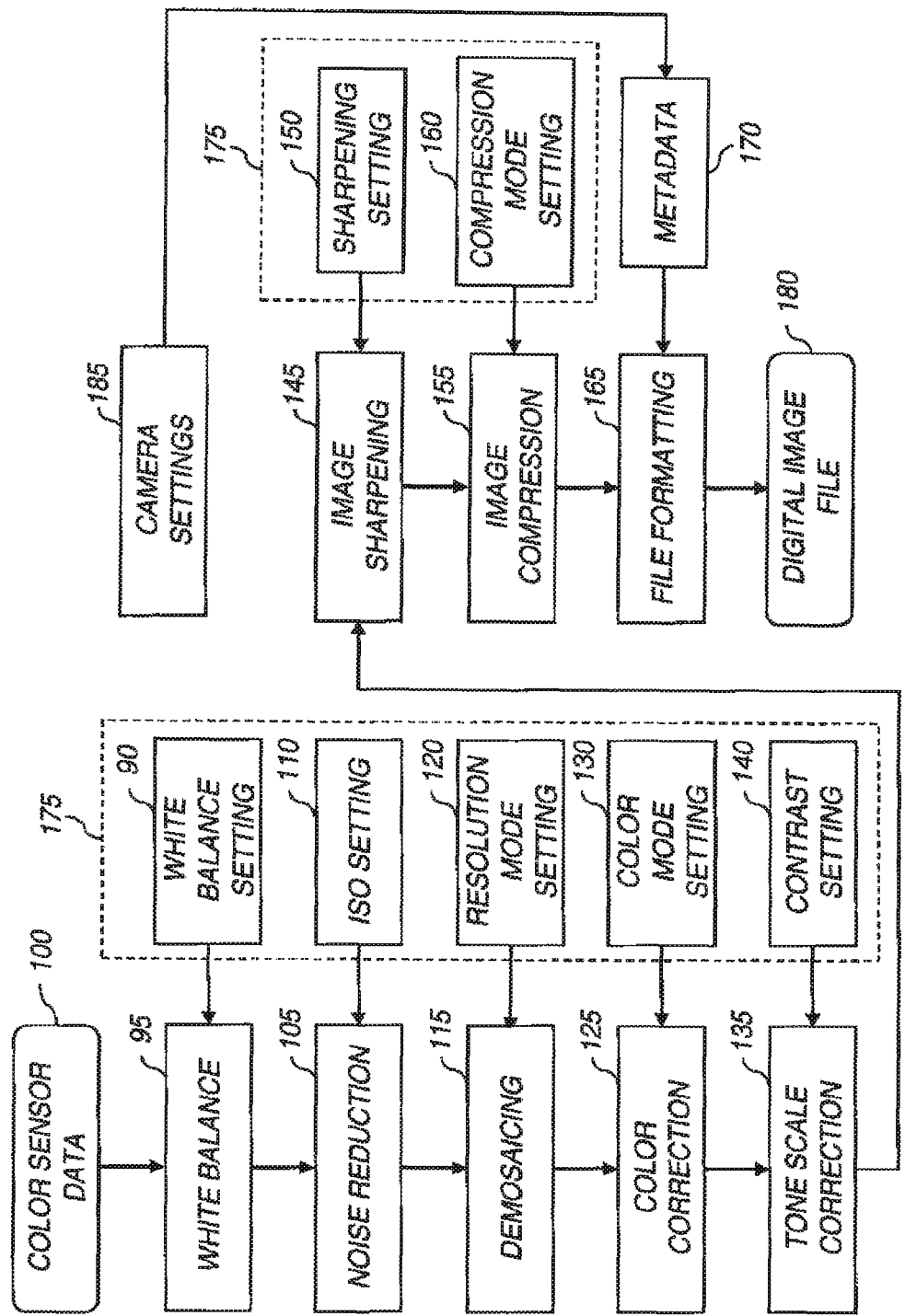
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which can be selected via the user controls 34 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Mild, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about camera settings 185.

Figure 3:
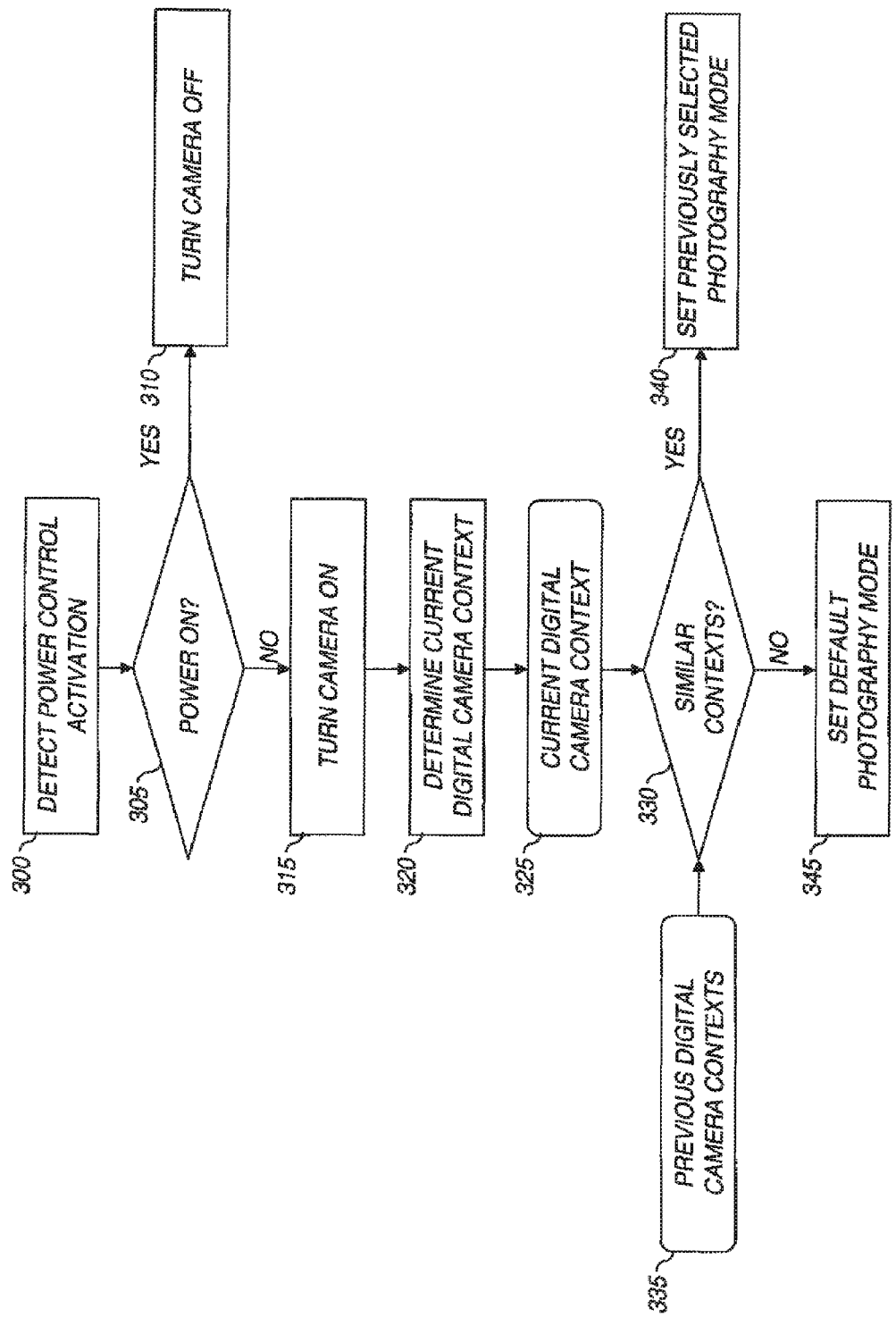
FIG. 3 is a flowchart illustrating a method for selecting a photography mode in a digital camera at power on according to an embodiment of the present invention.

The present invention will now be described with reference to FIG. 3, which is a flowchart illustrating a method for using the power control 35 (FIG. 1) on a digital camera 10 (FIG. 1) to select a photography mode according to an embodiment of the present invention. In FIG. 3, a detect power control activation step 300 detects a press of the power control 35 (FIG. 1). A power on test 305 checks whether the power is already on and makes a decision. If the power is already on, a turn camera off step 310 is executed, turning the camera power off. (Note that when the digital camera 10 (FIG. 1) is in the power off mode, the digital camera 10 may not be totally powered down, but may be in a sleep mode which uses a minimal level of power consumption.) If the power on test 305 determines that the power is not already on, the process continues to a turn camera on step 315, turning the camera power on. A determine current digital camera context step 320 is next used to determine a current digital camera context 325. The digital camera context is a set of information characterizing the picture-taking environment. As will be discussed in more detail later, the digital camera context can include information such as a date/time, a camera location, sensed scene characteristics, sensed audio signals, and event calendar entries. One or more previous digital camera context(s) 335 are stored in a persistent memory, together with information specifying corresponding previously selected photography modes that the digital camera user had selected to use with the previous digital camera context(s) 335. A similar contexts test 330 determines whether the current digital camera context 325 is sufficiently similar to one of the previous digital camera context(s) 335. If the current digital camera context 325 is sufficiently similar to one of the previous digital camera context(s) 335, then a set previously selected photography mode step 340 is used to set the digital camera 10 to operate in the corresponding previously selected photography mode. Otherwise, a set default photography mode step 345 is executed, setting the digital camera 10 to operate in a default photography mode. In this way, the previous user-selected photography mode is respected when the digital camera 10 is powered up, but only if the digital camera context is sufficiently similar.

In some embodiments of the present invention, the power control 35 is a pressure-sensitive button, or some other form of touch-sensitive surface. There are a variety of different types of pressure-sensitive buttons. Some pressure-sensitive buttons are spring-loaded mechanical buttons that depress to different positions depending on the depress pressure. When the button is depressed with a light pressure, the button depresses to a first position and gives a first signal (S1); and when the button is depressed with a heavy pressure, the button depresses to a second position and gives a second signal (S2). Other types of pressure-sensitive buttons use electronic pressure sensors which produce a variable electrical signal according to the applied pressure. There are a variety of different electronic pressure sensors known in the art, including piezoresistive pressure sensors, piezoelectric pressure sensors, electromagnetic pressure sensors or capacitive pressure sensors.

Digital cameras typically provide a variety of photography modes that the user can select from according to the photography conditions and their personal preferences. A wide variety of photography modes are known in the art. Examples of typical photography modes include smart capture, portrait, sport, landscape, close-up, sunset, backlight, children, bright, self-portrait, night portrait, night landscape, high-ISO, panorama, color boost, grayscale, sepia tone, aperture priority and shutter priority. Typically the photography mode can be selected using interactive menus provided as part of the user controls 34. Often it may be necessary to navigate through several levels of menus in order to select a particular photography mode.

In a preferred embodiment, the default photography mode selected by the set default photography mode step 345 is an automatic mode which is designed to produce good results under a wide variety of photography conditions. Such automatic modes go by a variety of different names such as "auto mode," "default mode," "smart capture mode" or "program mode." In this automatic mode, the digital camera 10 typically analyzes the photography conditions to automatically determine various image capture settings such as the exposure index, the lens F/#, the exposure time and the electronic flash setting, as well as other user settings 175, such as those discussed with reference to FIG. 2. In other embodiments, some other photography mode can be used as the default photography mode. In some embodiments, the user can be allowed to designate a preferred photography mode to be the default photography mode.

As an example of a scenario where the method of the present invention is valuable, consider the case where a user is capturing images at a soccer game, and has manually set the camera to operate in a sport photography mode. The sport photography mode would generally choose appropriate image capture settings to minimize the motion blur associated with moving subjects. The user may then choose to power down the digital camera 10 to save the battery life (or the digital camera 10 may automatically power itself down after a period of inactivity). If the user then desires to resume capturing additional images at the soccer game, they would typically desire to power the camera back on directly into the sport photography mode rather than the default photography mode in order to save the trouble of navigating through the various user control menus to select the appropriate photography mode. According to the method of the present invention, this is done automatically at power on by comparing the current digital camera context 325 with the previous digital camera context 335 when the sport photography mode was previously selected. If the digital camera contexts are sufficiently similar, the digital camera 10 is automatically returned to the previously selected sport photography mode.

As was discussed earlier, according to the method of the present invention, the similar contexts test 330 compares the current digital camera context 325 to one or more previous digital camera contexts 335. The previous digital camera contexts 335 are recorded in a persistent memory, together with indications of the corresponding user-selected photography mode.

In some embodiments, only a single previous digital camera context 335 is stored corresponding to the most recent user-selected photography mode.

In other embodiments, provision is made for storing a plurality of previous digital camera contexts 335. For example, the previous digital camera contexts 335 can be stored corresponding to the five most recent user-selected photography modes. Alternately, the previous digital camera contexts and the corresponding user-selected photography modes are stored for a predefined period of time (e.g., 48 hours). Storing a plurality of digital camera contexts can provide a number of advantages, especially with recurring events. For example, the sports photography mode can be selected while at a soccer game, then the portrait mode selected during a family party. When the camera is powered up again for another soccer game, the current digital camera context can be determined to be similar to the previous digital camera context associated with the sport photography mode and this mode can be automatically selected even though it was not the most recent user-selected photography mode.

Figure 4:
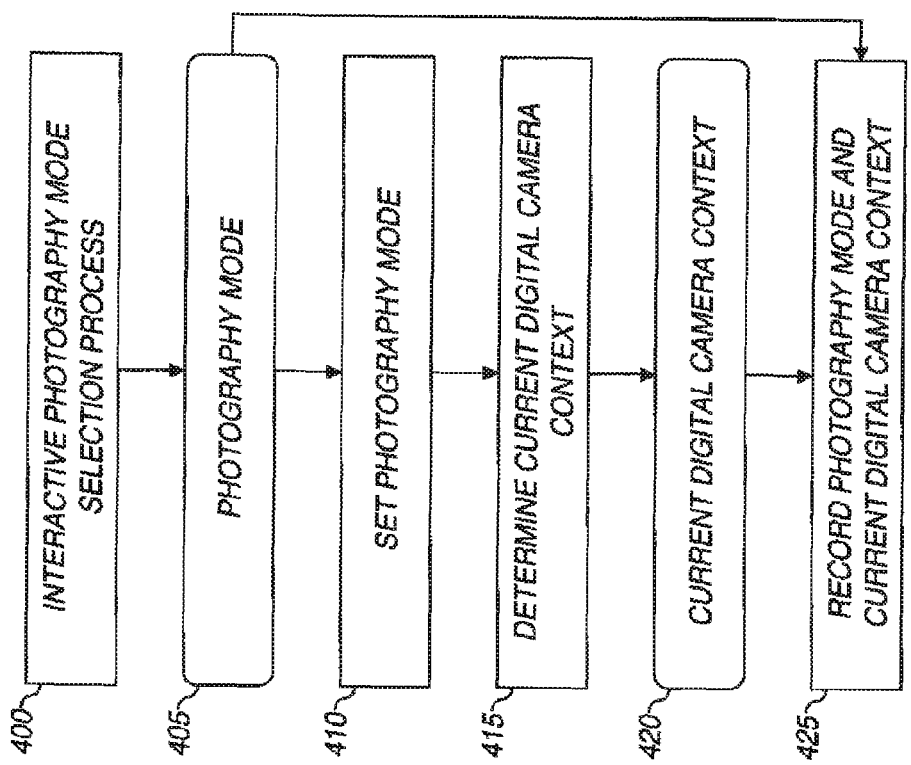
FIG. 4 is a flowchart depicting photography mode selection in a digital camera according to an embodiment of the present invention.

In some embodiments, the digital camera context and the corresponding photography mode are stored at the time when a user selects a particular photography mode as illustrated in FIG. 4. An interactive photography mode selection process 400 is used by a user to select a photography mode 405. The interactive photography mode selection process 400 can use any method known in the art for selection of a photography mode using the user controls 34 of the digital camera 10. For example, the user can select the photography mode 405 by navigating a series of interactive menus, or by using a photography mode dial. A set photography mode step 410 is used to set the digital camera 10 to operate in the selected photography mode 405. A determine current digital camera context step 415 is then used to determine a current digital camera context 420. An indication of the photography mode 405 and the current digital camera context 420 are then stored in a persistent memory using a record photography mode and current digital camera context step 425. In some implementations, the current digital camera context 420 is stored only at the time that the user first selects the photography mode. In other implementations, the current digital camera context 420 is updated and stored every time a digital image is captured using the user-selected photography mode. In this case, the stored current digital camera context 420 will correspond to the most recent image capture. When the digital camera context information includes a time/date factor, this approach may be preferable to ensure that the stored previous digital camera context 335 is most relevant for comparison with the current digital camera context 325 using the similar contexts test 330.

Figure 5:
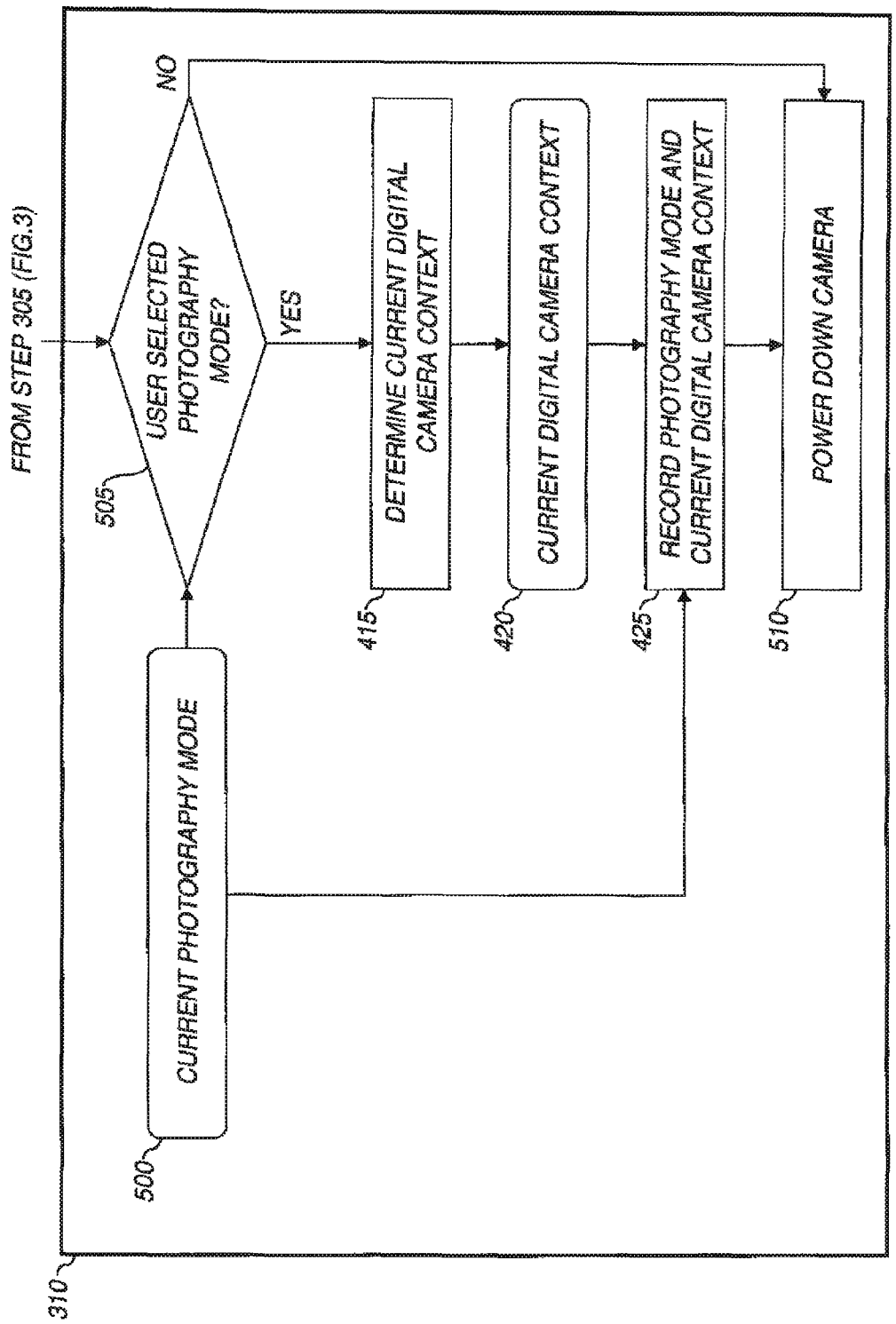
FIG. 5 is a flowchart depicting a power down sequence in a digital camera according to an embodiment of the present invention.

In some embodiments, the digital camera context and the corresponding user-selected photography mode are updated and stored at the time that the digital camera 10 is powered off. In this case, the process of storing the digital camera context and the corresponding photography mode can be incorporated into the turn camera off step 310 (FIG. 3). Additional details for a version of the turn camera off step 310 adapted for this purpose are illustrated in FIG. 5. When the process of turning the digital camera 10 to an OFF state is initiated, a user selected photography mode test 505 determines whether or not the current photography mode 500 was user-selected. If not, execution proceeds to a power down camera step 510, which executes a power down procedure to put the digital camera 10 into an OFF state. Otherwise, the determine current digital camera context step 415 is used to determine the current digital camera context 420. An indication of the current photography mode 500 and the current digital camera context 420 are then stored in a persistent memory using the record photography mode and current digital camera context step 425. Finally, the power down camera step 510 is executed to complete the process of putting the digital camera 10 into an OFF state. In some embodiments, only one digital camera context is stored corresponding to the user-selected photography mode that was active when the digital camera was most recently powered down. In other embodiments, multiple digital camera contexts can be stored as was discussed above.

The process shown in FIG. 5 makes the assumption that the user would only be concerned with returning to the previous photography mode if it is one that was manually user-selected. In alternate embodiments, indications of the current photography mode 500 and the current digital camera context 420 are then stored in memory whether or not the current photography mode 500 was user-selected.

It should be noted that the processes for storing the digital camera context described in FIGS. 4 and 5 are not mutually exclusive. In some embodiments, the photography mode and the digital camera context could be recorded both when a photography mode is manually user-selected and also at the time when the digital camera 10 is powered down. The digital camera context and the photography mode could also be recorded at other times as well. For example, they could be recorded at fixed time intervals (e.g., every 10 minutes) during an extended photography session, or they could be recorded if a substantial change in the digital camera context is detected (e.g., a significant change in the lighting level).

According to the present invention, the current digital camera context 325 associated with a photography mode selection includes one or more context factors characterizing the picture-taking environment. One skilled in the art will recognize that there are many different context factors that can be useful for characterizing the digital camera context. For example, useful context factors would include a time/date factor, a camera location factor, a scene similarity factor, a scene information factor, an audio similarity factor and a scheduled event factor. Each of these types of factors will be described in more detail below.

In some embodiments, the similar contexts test 330 (FIG. 3) considers only one type of context factor (e.g., time/date) in order to determine whether the current digital camera context 325 is sufficiently similar to one of previous digital camera contexts 335. In other cases, the similar contexts test 330 uses a plurality of independent context factors (e.g., both the camera location as well as the time/date).

In a preferred embodiment of the present invention, one context factor that is used by the similar contexts test 330 is the time/date. Generally, if a short length of time has transpired between the time that the digital camera 10 was operated in the previous photography mode and the current time, then it is reasonable to assume that the user would desire to return to the previously selected photography mode. For example, if the digital camera 10 was powered down for 5 minutes, the probability is high that the photography environment would be similar to the previous photography environment, and therefore that it would be appropriate to set the digital camera 10 to operate in the previously selected photography mode.

According to one embodiment of the present invention, the similar contexts test 330 determines that the current digital camera context 325 is sufficiently similar to a previous digital camera context 335 by determining a time interval between the current time/date and the time/date associated with the previous digital camera context and comparing it to a predetermined threshold (e.g., one hour). If the time interval is less than the predetermined threshold, then the digital camera 10 is set to operate in the previously selected photography mode, otherwise it is set to operate in the default photography mode.

In some embodiments, the similar contexts test 330 considers a camera location factor in the process of comparing the digital camera contexts. In this case, the digital camera context includes a camera location value. If a distance between camera locations is less than a predetermined threshold (e.g., 100 meters), then the digital camera can be set to operate in the previously selected photography mode. In some implementations, the camera location is a geographic location (e.g., longitude and latitude) determined using a global positioning system (GPS) sensor. In alternate implementations, the camera location is a relative location determined using an inertial sensing system including one or more accelerometers or gyroscopes. While such inertial sensing systems can not determine an absolute geographic location (unless they are provided with a known reference location), they can be used to effectively determine distances between two locations.

In some embodiments, the scene itself, as sensed by the image sensor 14 (FIG. 1), can also be used to provide context information. If a currently sensed scene is sufficiently similar to a previously captured scene, then this can provide a valuable clue that the digital camera is being operated in a similar image capture environment. For example, consider the case where the user was previously capturing images of a soccer game and then powered down the digital camera. When the user powers the digital camera back on and captures a preview image of the current scene, if the user is still at the soccer game then the currently sensed image will generally have a very similar appearance to the previously captured scene.

To provide the scene context information for the previously captured scene, a context image, preferably of low resolution, such as the same size as a preview image or smaller, can be stored as part of the previous digital camera context 335 and can be compared with a currently sensed context image, generated from a currently sensed preview image. In some embodiments, a captured full-resolution digital image that was captured using the previous user-selected photography mode can be used to provide the scene context information.

Any method for assessing image similarity known in the art can be used to assess the similarity between the sensed scenes. In some embodiments, scene similarity can be assessed by determining a difference image between the currently sensed scene and a previously captured scene. If the average difference signal is less than a predetermined threshold, then the digital camera contexts can be designated as being similar.

Directly comparing the previously captured scene to the currently sensed scene will often show differences due to differences in the camera orientation or changes in the scene content. To improve the scene comparison, some embodiments can use motion compensation to compensate for small differences in the camera orientation before computing the difference image signal.

Because image differences, even with motion compensation, will often be significant even with subtle scene changes, it will generally be preferable to utilize more sophisticated image similarity algorithms to assess scene similarity. Such algorithms typically assess scene similarity by analyzing the scene to determine feature vectors representing various scene attributes (e.g., color histograms, scene texture features and scene motion features). An example of an algorithm that can be used to determine a scene similarity value according to the present invention is the scale-invariant features (SIFT) algorithm described by Lowe in the article "Distinctive image features from scale invariant keypoints" (Intl. Journal of Computer Vision, Vol. 60, pp. 91-110, 2004), which is incorporated herein by reference.

In other embodiments, a semantic scene classification algorithm can be used to analyze the sensed scene and classify it into one of a set of predetermined scene classification categories. For example, the scenes can be classified according to scene type (e.g., beach, sunset), event type (e.g., birthday, wedding), location (e.g., museum, playground) or object type (e.g., animal, boat). One such classification algorithm that can be used in accordance with the present invention is disclosed in commonly-assigned, co-pending U.S. Patent Application Publication 2009/0297032, to Loui et al., entitled "Semantic event detection for digital content records," which is incorporated herein by reference. A current digital camera context 325 can be designated to be similar to a previous digital camera context 335 if it is classified according to the same classification category.

In some embodiments, the similar contexts test 330 assesses digital camera context similarity by considering one or more scene information factors related to sensed information about the scene. For example, the sensed scene information can include a scene brightness level, a scene color balance and a focus distance. If the currently sensed scene has a similar brightness level, a similar color balance, and a similar focus distance to the previously sensed scene, it can be inferred that the current digital camera context is similar to the previous digital camera context. In some embodiments, a scene brightness difference, a scene color balance difference and a scene focus distance difference are determined. A total difference is then determined by performing a weighted sum of these difference values. If the total difference is less than a predetermined threshold, then the current digital camera context 325 can be designated to be sufficiently similar to the previous digital camera context. In other embodiments, only a subset of these scene information attributes are considered, or alternately other pieces of information can be included.

Audio signals associated with an image-capture environment can provide important clues about the digital camera context. For example, beach scenes, or sporting event scenes or birthday party scenes are typically associated with very different sound characteristics. In some embodiments, the similar contexts test 330 assesses digital camera context similarity by considering an audio similarity factor. Any techniques known in the art for comparing audio signals can be used to assess a similarity of the digital camera context. Such techniques often involve computing frequency spectrum representations of the audio signals and computing differences between the frequency spectrums. In some embodiments, frequency spectrum associated with the previous digital camera contexts are determined and are stored as part of the digital camera context representation. The frequency spectrum of an audio signal captured in the current environment can then be determined for comparison.

Another type of factor that can be considered by the similar contexts test 330 is a scheduled event factor. Scheduled event factors are useful for digital cameras 10 that have access to an event calendar used to store scheduled events associated with the digital camera user. In some embodiments, the event calendar can be stored locally within the digital camera 10. This is commonly the case for applications such as smart phones, PDAs or laptop computers that include digital cameras. In other embodiments, the digital camera 10 can access an externally stored event calendar through a communications network, either wired or wireless. As described in commonly assigned U.S. Patent Application Publication 2007/0008321 entitled "Identifying collection images with special events" to Gallagher et al., the disclosure of which is incorporated herein by reference, an event calendar can be used to associate digital images with events on an event calendar.

In some embodiments, the current digital camera context 325 is determined to be sufficiently similar to the previous digital camera context 335 if both the current time/date and a time/date associated with the previous digital camera context fall within a time interval associated with a stored scheduled event. For example, if the event calendar shows a soccer game being scheduled between 6-8 PM on a particular date, and if both digital camera contexts have time/dates that fall within this range, then it can be inferred that they have similar digital camera contexts. Therefore, if a user-selected sport photography mode was associated with the previous digital camera context, the same photography mode can be automatically selected.

In some implementations, the digital camera context can be designated to be sufficiently similar to one of the stored previous digital camera contexts if the current time/date corresponds to a current scheduled event on the event calendar that is of a same event type as a scheduled event corresponding to a time/date associated with one of the stored previous digital camera contexts. For example, if a previous digital camera context is associated with a time/date corresponding to a soccer game, and the current time/date also corresponds to a soccer game, then the same photography mode can be automatically selected.

In some cases, an event type can be associated with a previously captured digital image, or set of digital images. The associated event type can then be associated with the digital camera context. The event type can be determined using an event calendar, or alternatively can be manually user-designated or can be determined by automatically analyzing the captured digital images. In some cases, it may be possible to infer an event type from the user-selected photography mode (e.g., if a sport photography mode is selected, it can be assumed that the digital camera is being used to photograph a sporting event). In such cases, the digital camera context can be designated to be sufficiently similar to a previous digital camera context if the current time/date corresponds to a current scheduled event that is of a same event type as the event type associated with the previous digital camera context.

As mentioned earlier, the similar contexts test 330 can be based on a single context factor (e.g., a time/date factor), or alternatively can consider a plurality of context factors. In such cases, the plurality of context factors can be combined using any method known in the art to determine a combined context similarity value that is representative of the differences between the current digital camera context and the previous digital camera context. In some embodiments, factor similarity values can be determined for a plurality of different context factors (e.g., a time/date similarity value and a location similarity value). The factor similarity values can then be combined using an appropriate mathematical relationship to determine the combined context similarity value. For example, the combined context similarity value can be computed using a weighted summation of the individual factor similarity values. Alternately, the combined context similarity value can be determined based on the individual factor similarity value indicating the highest degree of similarity. In this way, the digital camera contexts would be indicated to be similar if the time/date is similar or the location is similar, even if both the time/date and location attributes are not similar.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
35 power control
36 display memory
38 wired interface
40 computer
44 video interface
46 video display
48 interface/recharger
50 wireless modem
52 radio frequency band
58 wireless network
70 Internet
72 photo service provider
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 user settings
180 digital image file
185 camera settings
300 detect power control activation step
305 power on test
310 turn camera off step
315 turn camera on step
320 determine current digital camera context step
325 current digital camera context
330 similar contexts test
335 previous digital camera contexts
340 set previously selected photography mode step
345 set default photography mode step
400 interactive photography mode selection process step
405 photography mode
410 set photography mode step
410 set photography mode step
415 determine current digital camera context step
420 current digital camera context
425 record photography mode and current digital camera context step
500 current photography mode
505 user selected photography mode test
510 power down camera step

What is claimed is:
1. A method comprising:
storing a plurality of digital contexts, wherein a digital context comprises values for a plurality of environment factors, and wherein at least two of the plurality of environment factors are chosen from the group of: time/date, location, motion, brightness, audio, and a scheduled event;
associating a particular photography mode with each digital context based, at least in part, upon data indicating a user interface selection of the particular photography mode;

sensing a current digital context, the current digital context comprising values for a plurality of current environment factors;
determining if the current digital context matches a stored digital context; and
when the current digital context matches a stored digital context, selecting the photography mode associated with the stored digital context to be the current photography mode.

2. The method of claim 1, further comprising:
when the current digital context does not match a stored digital context, storing the current digital context as a new digital context; and
storing an association between the new digital context and a photography mode identified by receipt through a user interface of a camera device.

3. The method of claim 1, wherein determining if the current digital context matches a stored digital context comprises determining whether a plurality of values for current environment factors match a plurality of values for environment factors of a stored digital context.

4. The method of claim 1, wherein the plurality of environment factors includes scene information.

5. The method of claim 1, wherein determining if the current digital context matches a stored digital context comprises determining if the difference between a value for at least one environment factor of a digital context and a value of a corresponding current environment factor is less than a threshold.

6. The method of claim 1, further comprising, if the current digital context matches a stored digital context, using the photography mode associated with the stored digital context to capture an image of a current scene.

7. The method of claim 2, further comprising, when the current digital context does not match a stored digital context, using a default photography mode to capture an image of a current scene.

8. The method of claim 7, wherein the default photography mode is an automatic photography mode.

9. A non-transitory computer memory storing instructions that, when executed by a processor, cause the processor to:
store a plurality of digital contexts, wherein a digital context comprises values for a plurality of environment factors, and wherein at least two of the plurality of environment factors are chosen from the group of: time/date, location, motion, brightness, audio, and a scheduled event;
associate an operational mode of a device with each digital context based, at least in part, upon data indicating a user interface selection regarding the operational mode;
sense a current digital context, the current digital context comprising values for a plurality of current environment factors;
determine if the current digital context matches a stored digital context; and
when the current digital context matches a stored digital context, select the operational mode associated with the stored digital context to be the current operational mode.

10. The non-transitory computer memory of claim 9, wherein the instructions, when executed by a processor, further cause the processor to:
when the current digital context does not match a stored digital context, store the current digital context as a new digital context; and
store an association between the new digital context and an operational mode identified by receipt through the user interface.

11. The non-transitory computer memory of claim 9, wherein determining if the current digital context matches a stored digital context comprises determining whether values for a plurality of current environment factors match values for a plurality of environment factors of a stored digital context.

12. The non-transitory computer memory of claim 9, wherein sensing a current digital context comprises reading the output of a sensor chosen from the group of: an accelerometer, a gyroscope, or a GPS.

13. The non-transitory computer memory of claim 9, wherein sensing a current digital context comprises reading a calendar.

14. The non-transitory computer memory of claim 9, wherein the operational modes comprise photography modes.

15. The non-transitory computer memory of claim 9, wherein determining if the current digital context matches a stored digital context comprises determining if the difference between a value for a least one environment factor of a previous digital context and a value of a corresponding current environment factor is less than a threshold.

16. A digital image capture device, comprising:
an image sensor;
an optical system communicatively coupled to the image sensor; and
one or more processors communicatively coupled to the image sensor and configured to execute instructions to cause the one or more processors to:
store a plurality of digital contexts, wherein a digital context comprises values for a plurality of environment factors, and wherein at least two of the plurality of environment factors are chosen from the group of: time/date, location, motion, brightness, audio, and a scheduled event;
associate a particular photography mode with each digital context based, at least in part, upon data indicating a user interface selection of the particular photography mode;
sense a current digital context, the current digital context comprising values for a plurality of current environment factors;
determine if the current digital context matches a stored digital context; and
select the photography mode associated with the stored digital context if the current digital context matches the stored digital context.

17. The digital image capture device of claim 16, wherein the instructions to cause the one or more processors to determine if the current digital context matches a stored digital context comprise instructions to cause the one or more processors to determine if the difference between a value for a least one environment factor of a previous digital context and a value of a corresponding current environment factor is less than a threshold.

18. The digital image capture device of claim 16, wherein the instructions to cause the one or more processors to sense a current digital context comprise instructions to cause the one or more processors to read the output of a sensor chosen from the group of: an accelerometer, a gyroscope, or a GPS.

19. The system of claim 16, wherein the instructions to cause the one or more processors to sense a current digital context comprise instructions to cause the one or more processors to read a calendar.

20. The digital image capture device of claim 16, wherein the instructions further cause the one or more processors to use a default photography mode to capture an image of a current scene if the current digital context does not match a stored digital context.

\* \* \* \* \*